(12) United States Patent
Titmas

(10) Patent No.: US 8,173,024 B2
(45) Date of Patent: May 8, 2012

(54) METHOD AND APPARATUS FOR CONDUCTING SUPERCRITICAL WET OXIDATION REACTIONS CONTAINED WITHIN A FLUID ENVELOPE

(75) Inventor: James Titmas, Stow, OH (US)

(73) Assignee: Eau-Viron Incorporated, Gaylordsville, CT (US)

( * ) Notice: Subject to any disclaimer, the term of this patent is extended or adjusted under 35 U.S.C. 154(b) by 0 days.

(21) Appl. No.: 13/218,837

(22) Filed: Aug. 26, 2011

(65) Prior Publication Data

US 2011/0309035 A1      Dec. 22, 2011

Related U.S. Application Data

(62) Division of application No. 12/220,517, filed on Jul. 25, 2008, now Pat. No. 8,017,089.

(51) Int. Cl.
*C02F 1/72*       (2006.01)
(52) U.S. Cl. ......... 210/761; 210/205; 422/241; 422/242

(58) Field of Classification Search .................. 210/749, 210/758, 759, 760, 761, 205, 774, 175–187; 422/25, 184.1, 224, 226, 242, 241
See application file for complete search history.

(56) References Cited

U.S. PATENT DOCUMENTS 5,558,783 A * 9/1996 McGuinness ................. 210/761
5,670,040 A * 9/1997 Ahluwalia .................... 210/205

* cited by examiner

*Primary Examiner* — Joseph Drodge
*Assistant Examiner* — Lucas Stelling
(74) *Attorney, Agent, or Firm* — Renner, Kenner, Greive, Bobak, Taylor & Weber

(57) ABSTRACT

A method and apparatus for conducting supercritical wet oxidation reactions wherein any precipitated solids do not contact the solid side walls of the containment vessel so as to prevent any of these precipitated solids from adhering to or corrode the vessel walls is provided. To do this, a controlled, continuous flow of clean fluid, preferably under supercritical conditions, is introduced to the process so as to form a film-like, clean fluid surface between the physical containment vessel walls and the supercritical wet oxidation reactants.

8 Claims, 8 Drawing Sheets

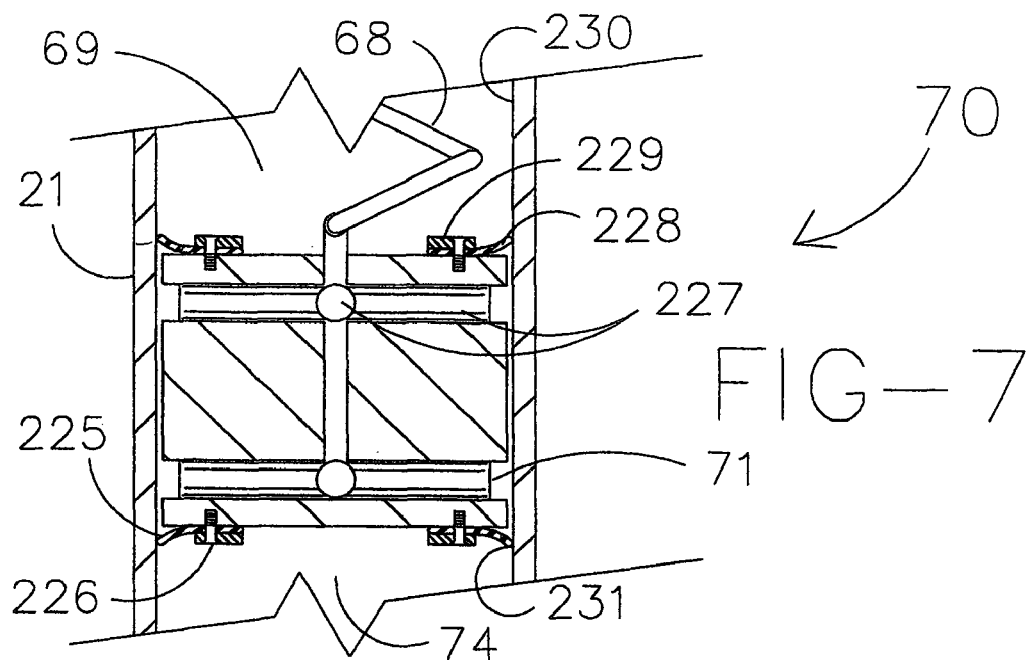
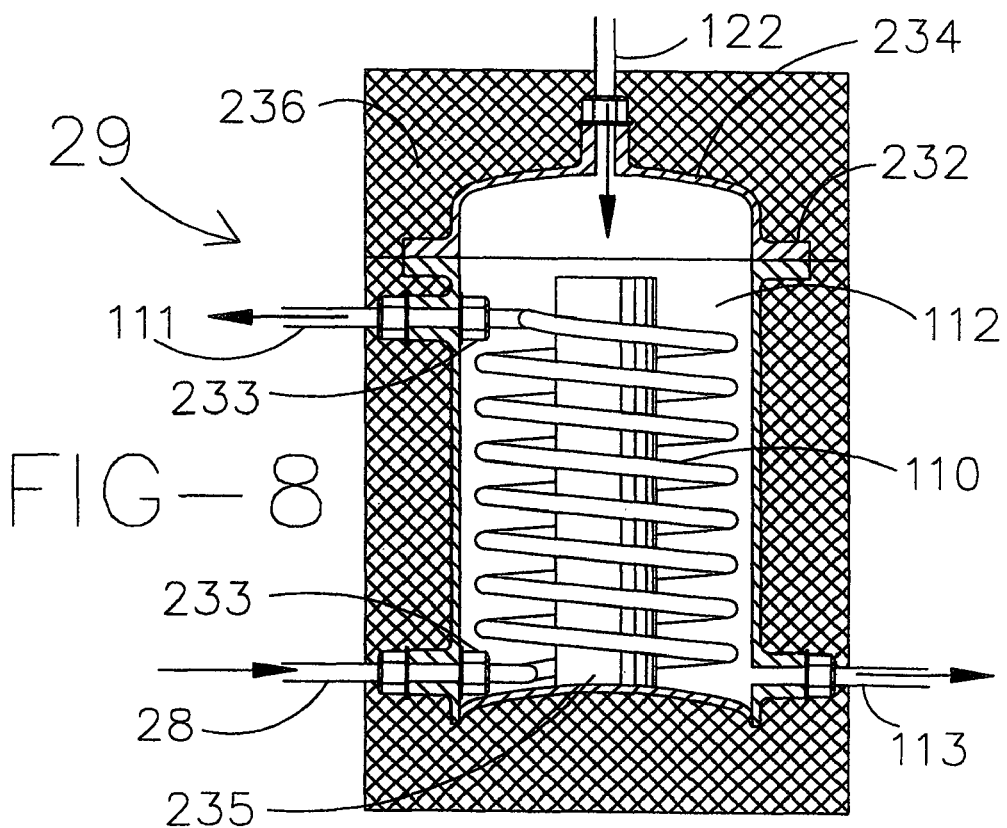

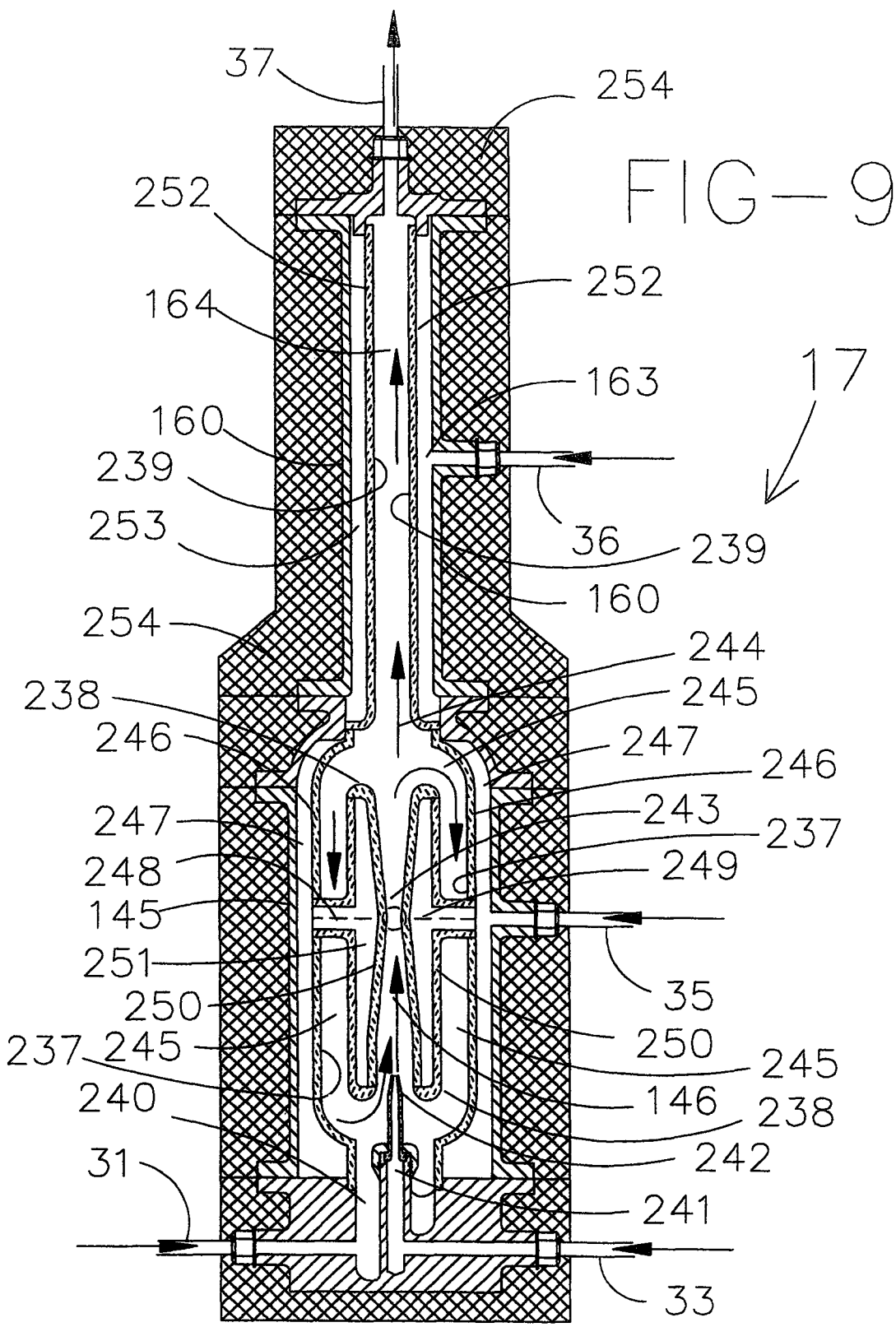

METHOD AND APPARATUS FOR CONDUCTING SUPERCRITICAL WET OXIDATION REACTIONS CONTAINED WITHIN A FLUID ENVELOPE

CROSS-REFERENCE TO RELATED APPLICATION

This application is a division of U.S. patent application Ser. No. 12/220,517 filed on Jul. 25, 2008 now U.S. Pat. No. 8,017,089.

TECHNICAL FIELD

This invention relates generally to a method and apparatus for conducting supercritical wet oxidation reactions. More particularly, the present invention relates to a method and apparatus for conducting these reactions without any adhesive or corrosive materials precipitated from the process within the apparatus coming into contact with any solid surfaces of the apparatus, and for controlling the pressurization of the reaction chamber and other parts of the apparatus.

BACKGROUND FOR THE INVENTION

Wet combustion of oxidizable materials suspended and dissolved in supercritical fluid such as water is known to result in an extraordinary level of oxidation at the molecular and atomic level. Because of the ability of supercritical water to dissolve straight chain hydrocarbons, ring hydrocarbons and oxygen into solution, the desired wet combustion reaction in supercritical water is more rapid and more complete than a wet combustion reaction of heterogeneous mixtures of the same materials suspended in subcritical water. In fact, by using supercritical water in the wet combustion process, the degree of oxidation of organic materials can be so complete that organic materials are undetectable in the resultant fluid. The complete oxidation of organic materials to the undetectable limits of technology makes this process extremely valuable in the treatment of water contaminated with oxidizable materials.

However, unlike subcritical water, supercritical water will not retain materials such as minerals and salts in solution. Hence, any remaining minerals and salts will eventually precipitate from the solution. The resultant precipitate is notoriously adhesive, and therefore, tends to accumulate in the containment vessel, typically to the walls of the containment vessel or at any restrictive outlets of the containment vessel. This accumulation interrupts the desired continuous use of the apparatus and method and in the extreme, terminates the process altogether.

This problem with the adhesive, precipitated materials is further exasperated and complicated when the apparatus employed for supercritical wet oxidation uses piston stroke pumps and one-way valves for pressurization of the heterogeneous materials. That is, for example, pressurization of the heterogeneous materials may cause the one-way valves not to seat when using piston stroke pumps. Hypodermic pumps may clean the sides of the apparatus and may remove suspended solids in a superior manner, but cleaning applications employing those pumps is limited to suspended solids less than 100 microns in size. Moreover, the problem of pressure containment still exists when the stroke is reversed.

Accordingly, attempts have been made to develop methods and apparatus for supercritical wet oxidation that can control this problem of suspended solids pressurization. To that end, U.S. Pat. No. 4,594,164 first attempted to solve the problem by the use of a fluid film of subcritical water to pass between the supercritical water and the containment vessel. However, there was no control over the thickness of the fluid film, and no provision was made for the fluid film to be "clean" or free of dissolved or suspended solids. Due to these shortcomings, the process was restricted to "near" supercritical conditions as the subcritical fluid film would otherwise be quickly brought to supercritical conditions resulting in the adverse precipitations.

Later patents, such as U.S. Pat. Nos. 4,543,190 and 4,292,953 alleged benefits of supercritical wet oxidation, but neither patent made any attempt to control the precipitation of adhesive solids or salts resulting in applications limited to process streams having a flow capacity of less than 1 gallon per minute. Moreover, the deposition of adhesive solids required frequent replacement of containment vessel components.

Further, precipitated materials tend to be severely corrosive to the containment vessel as is obvious when the precipitated salt is sodium chloride, and less obvious when the precipitant is a metal such as arsenic. The corrosive tendencies tend to be so severe as to require the replacement of the containment vessel after each use, or to make the vessel out of gold, which is not practical.

Thus the problem of adequate control over the precipitation of adhesive and corrosive solids that would otherwise be dissolved or suspended in subcritical fluids, but are not in supercritical fluids, remains unsolved, as does the problem of pressurization of water with suspended solids larger than 100 microns. The fundamental need in waste water remediation using supercritical wet oxidation lies entirely within the arena of those situations for which the existing art has not resolved these problems.

SUMMARY OF THE INVENTION

It will, therefore, be appreciated that one aspect of one or more embodiments of the present invention is to provide a method and apparatus for conducting supercritical wet oxidation reactions wherein any precipitated solids do not contact the solid side walls of the containment vessel so as to prevent any of these precipitated solids from adhering to or corrode the vessel walls. To do this, a controlled, continuous flow of clean fluid, preferably under supercritical conditions, is introduced to the process so as to form a film-like, clean fluid surface between the physical containment vessel walls and the supercritical wet oxidation reactants. The fluid, such as clean supercritical water, not only intercedes between the reactants and the containment vessel, thereby preventing the reactants and any precipitated solids from adhering to or corroding the walls, but may also preferably intercede between the suspended solids in the initial water mixture and the pressurization device for the apparatus. That is, the invention provides for the creation of a continuously renewed clean fluid surface between the physical containment vessel of the reaction and the reaction itself, as well as the means to raise the process suspended solids in water to the required reaction pressures while maintaining a clean fluid film between the solid surfaces of the pressurizing device and the heterogeneous mixtures being pressurized. Advantageously, the use of a controlled, continuous film of water also provides for the constant cleaning of the process apparatus without having to take the apparatus off line.

Still other possible aspects of one or more embodiments of the present invention may include the ability to induce intense mixing of the reactants immediately upon reaching supercritical conditions; the ability to recover a substantial portion of the heat of reaction in the supercritical wet oxidation chamber to pre-heat the reaction chamber reactants feed; the ability to step wise reduce the pressure of the reaction chamber without the use of throttling valves or other moving parts; and the ability to deposit the precipitated materials from the supercritical wet oxidation fluids on like materials in suspension, thereby protecting the containment vessel from solids accumulation.

In the reaction chamber itself, the fluid surface is created and accomplished by the use of a double wall structure wherein the outer wall is of a non-porous material such as a metal, provided typically for structural support, while the inner wall is of a porous material, such as a ceramic, for physically containing the reactants. The clean, preheated supercritical fluid to be used as the fluid surface between the reactants and the physical porous walls is set forth in the reaction chamber under a slightly higher pressure of a few (e.g., about 10) pounds than the supercritical reaction chamber reactants, such that the clean fluid can passed through the porous ceramic walls in an amount and at a pressure and velocity sufficient to provide a fluid surface to the ceramic wall. The clean supercritical fluid is also maintained at a higher pressure and velocity against the metal outer wall to provide a protective fluid surface and prevent adhesion of materials, and erosion and corrosion of that wall as well.

One or more of these aspects of the present invention, which will become apparent from the description to follow, are accomplished by the improvements hereinafter described and claimed.

In general, the present invention provides a method for conducting a supercritical wet oxidation reaction between at least two reactants within a supercritical reaction vessel having at least one vessel wall for physically containing the reaction. The method comprising the steps of introducing a continuous flow of de-mineralized, supercritical fluid into the supercritical reaction vessel to form a film-like, clean fluid surface between the reactants and the at least one vessel wall; and comingling the reactants to form a reaction product.

Other aspects of the invention may be achieved by an apparatus for conducting supercritical wet oxidation reactions with reactants. The apparatus comprises a supercritical reaction vessel having at least one porous vessel wall for physically containing the reaction; wherein the at least one porous vessel wall is porous in an amount sufficient to pass de-mineralized supercritical fluid through the at least one porous vessel wall at a pressure and velocity sufficient to provide a fluid surface to the at least one vessel wall between the at least one vessel wall and the reactants.

Other aspects of the invention may be achieved by an apparatus for pressurizing a fluid to a desired pressure level. The apparatus comprises a charging cylinder having a surface contact area; a free head plunger having a labyrinth therein, the free head plunger movable within the charging cylinder and dividing the charging cylinder into two chambers, wherein one of the two chambers is connected to a three way valve for dispensing high pressure water into the chamber or for permitting the removal of the water from the chamber; and the other of the two chambers has an inlet for receiving the fluid to be pressurized and an outlet for conveying the pressurized fluid out of the charging cylinder; and high pressure water dispensing means for conveying water under higher pressure than the pressure of the water or the fluid in either of the two chamber to the labyrinth within the free head plunger such that the free head plunger is fluidly sealable against the charging cylinder.

Still other aspects of the invention may be achieved by a method for preheating and cooling a flowing, fluidized material within the same apparatus comprising: providing a plurality of baths to preheat and to cool the fluidized material within a flow path of the apparatus; circulating a fluid through the plurality of baths in counter-directional flow to the flow path of the fluidized material, whereby when the fluid is hot, the fluidized material is heated by heat energy taken from the fluid and when the fluid is cool, the fluidized material is cooled by releasing heat energy to the fluid; and re-circulating the cooled fluid to the cooling bath and the heated fluid to the preheating baths.

Still other aspects of the present invention may be achieved by a tunable pressure releasing apparatus comprising: a plurality of orifice blocks connected serially to each other and connected in parallel by a plurality of valves, wherein each valve is operatively connected to a respective orifice block and wherein each valve is operational to fully open or fully close access to its respective orifice block, without the use of throttling valves.

BRIEF DESCRIPTION OF THE DRAWINGS

A preferred exemplary supercritical wet oxidation assembly incorporating the concepts of the present invention is shown by way of example in the accompanying drawings without attempting to show all of the various forms and modifications in which the invention might be embodied, the invention being measured by the appended claims and not by the details of the specification.

FIG. 7 is an enlarged, sectional side elevational view of the free head plunger shown in FIG. 2.

FIG. 8 is an enlarged, sectional, side elevational view of one of the stage heaters shown in FIG. 3 or coolers shown in FIG. 5.

FIG. 9 is an enlarged, sectional, side elevational view of the supercritical wet oxidation reaction chamber shown in FIG. 4.

PREFERRED EMBODIMENT FOR CARRYING OUT THE INVENTION

Figure 1:
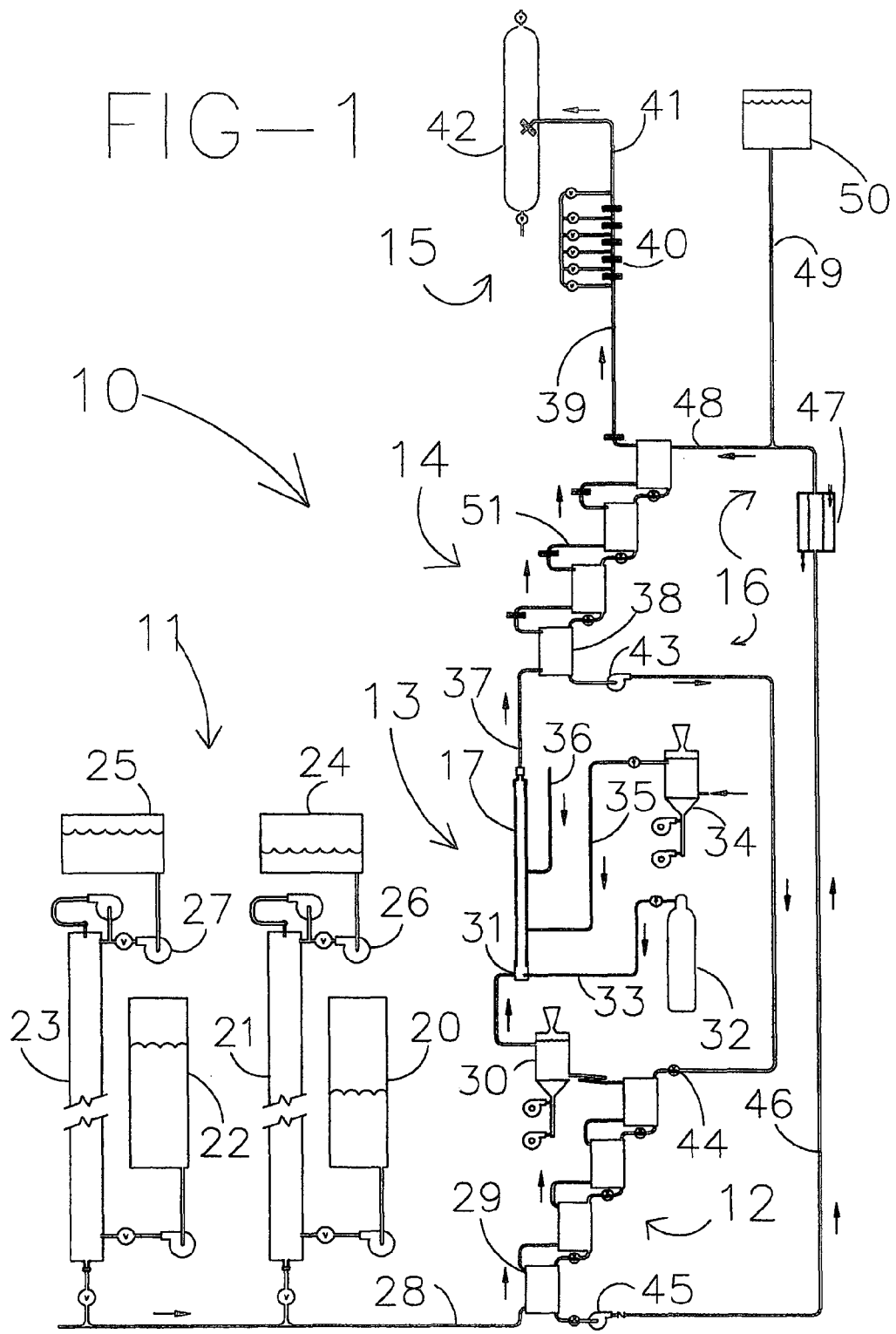
FIG. 1 is a schematic representation of a supercritical wet oxidation assembly illustrating its interrelation with the peripheral support devices according to the present invention.

A supercritical wet oxidation apparatus assembly for processing, via wet combustion, of a fluid mixture containing oxidizable materials in a supercritical fluid, such as water, according to the present invention is schematically shown in FIG. 1 and generally indicated by the numeral 10. The apparatus assembly 10 includes a pressurizing sub-assembly, generally indicated by the numeral 11, which pressurizes the fluid mixture up to the required supercritical pressure of about 4,000 pounds per square inch. The sub-assembly 11 delivers the fluid mixture to be processed to a preheating sub-assembly, generally indicated by the numeral 12. After preheating, the fluid mixture is delivered to a supercritical reaction vessel sub-assembly, generally indicated by the numeral 13, which includes a supercritical reaction vessel 17 with appurtenances. The treated fluid mixture is then transferred to a post treatment cooling and initial pressure dropping sub-assembly, generally indicated by numeral 14. After most of the temperature has been removed from the process, the final pressure drop is accomplished by final pressure relief sub-assembly, generally indicated by numeral 15, which includes variable expendable orifice blocks. A heat recovery fluid circulation loop sub-assembly is also shown and denoted generally as numeral 16. It should be noted that sub-assemblies 12, 13, 14, and 15 are stacked vertically to allow the natural purging of entrained gases, steam, and excess oxygen to bleed from the system.

Figure 2:
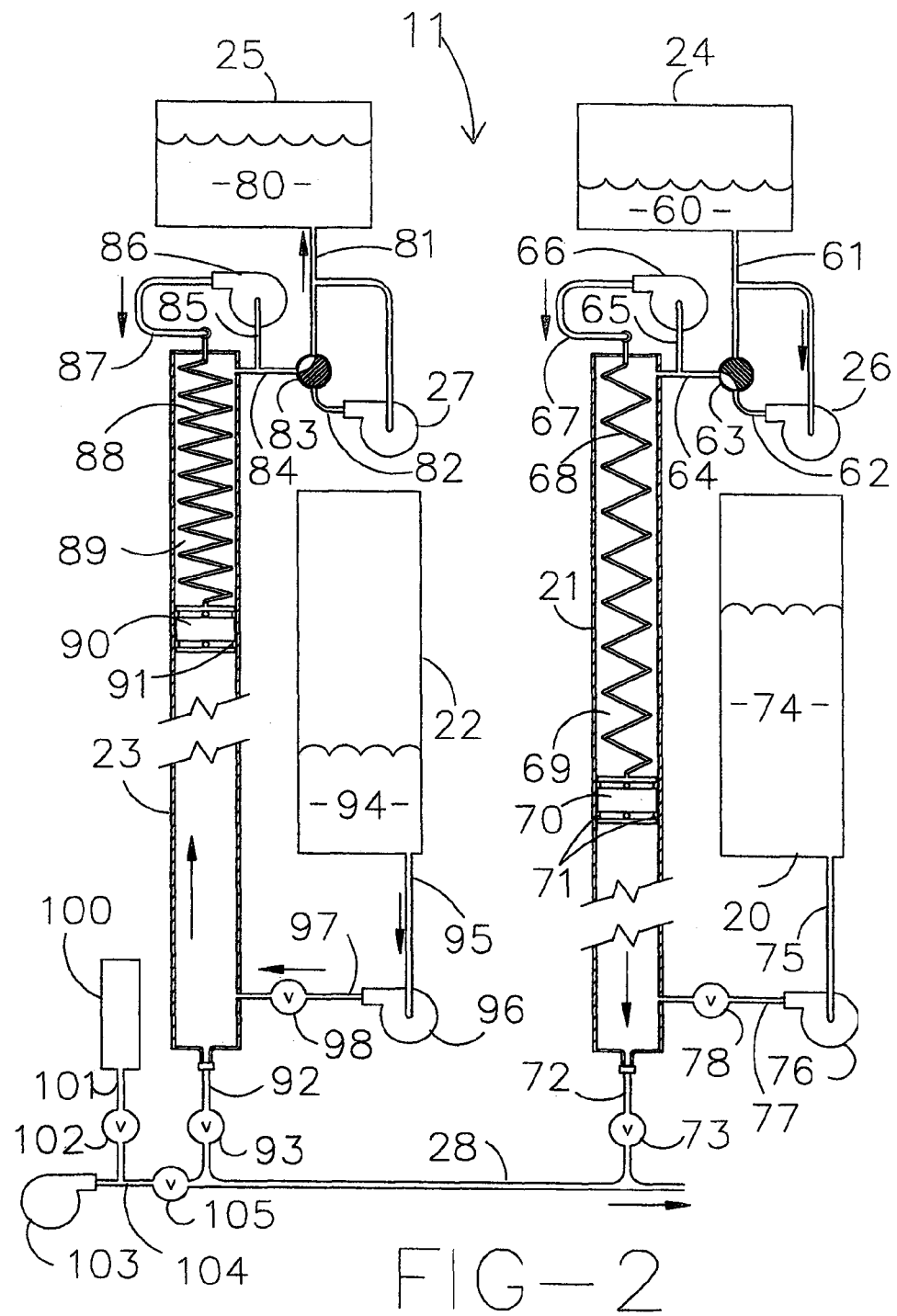
FIG. 2 is a sectional, side elevational view of the pressurizing and pumping sub-assembly and charging units according to the present invention.

As shown in FIGS. 1 and 2, pressurization within sub-assembly 11 may be accomplished in a plurality of modules which operate sequentially. Each module consists of a source of materials to be processed from a tank 20 and 22, said materials being from about 1% to about 20% oxidizable materials suspended in water in one embodiment. The materials are transferred to a charging cylinder 21 and 23. A supply of clean water at ambient temperature is shown as in 24 and 25, wherein the clean water may be delivered to the cylinders 20 and 21, respectively, via pipes and a high pressure delivery pump, shown as 26 and 27, respectively. Pumps 26 and 27 deliver the clean water at pressures up to about 5000 pounds per square inch to cylinders 21 and 23, respectively. The materials to be processed are then delivered via tube 28 to the preheat stage sub-assembly 12.

Figure 3:
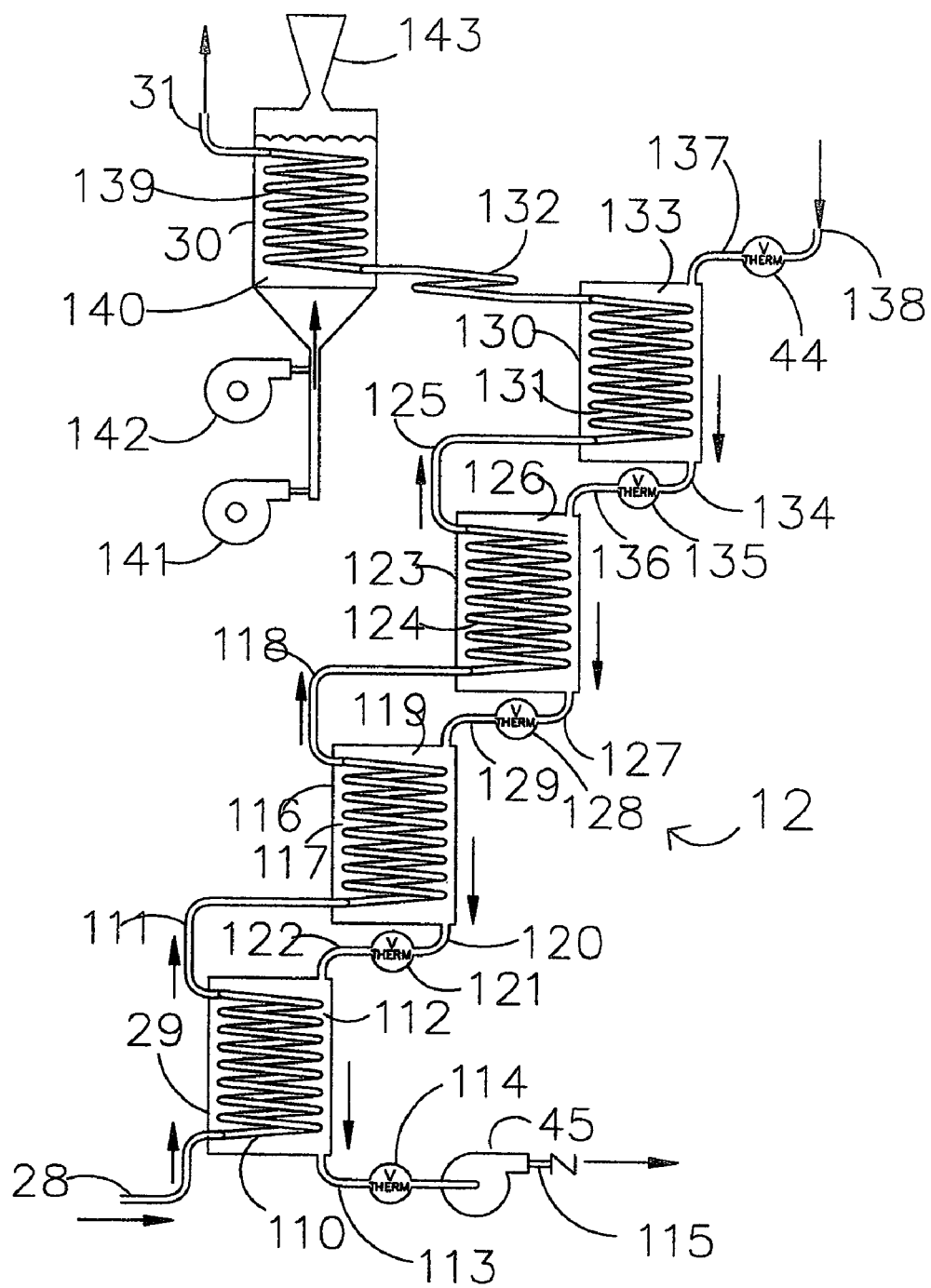
FIG. 3 is a sectional, side elevational view of the preheating sub-assembly for preheating the process mixture intended for supercritical wet oxidation.

As shown in FIGS. 1 and 3, preheating sub-assembly 12 comprises a number of heating fluid baths 29 in sequence, each raising the temperature in preheat stages by roughly about 150° F. There may be as many fluid baths as are needed for the preheat stages. In at least one embodiment the heating fluid is heating oil, but oil is not the only fluid that can be used. However, it is desirable for the hot fluid to attain the appropriate temperatures without boiling, and without posing a corrosion threat to the metals used for the construction of the tube containing the materials to be treated. After the preheating of the materials within the baths 29 has accomplished, the materials to be processed may then be directed to a final preheat stage. In one embodiment, this final stage is configured as a gas fired fluidized bed furnace 30. It will be appreciated that any source of heat, such as for example, electricity, can be used. In this final preheating stage, the materials to be processed are preheated to that level whereby the exothermic heat released from the supercritical wet oxidation reaction will raise the mixtures of water and oxidizable materials to the desired reaction temperature. The mixture is then conveyed via tube 31 to the supercritical wet oxidation reaction vessel sub-assembly.

Figure 4:
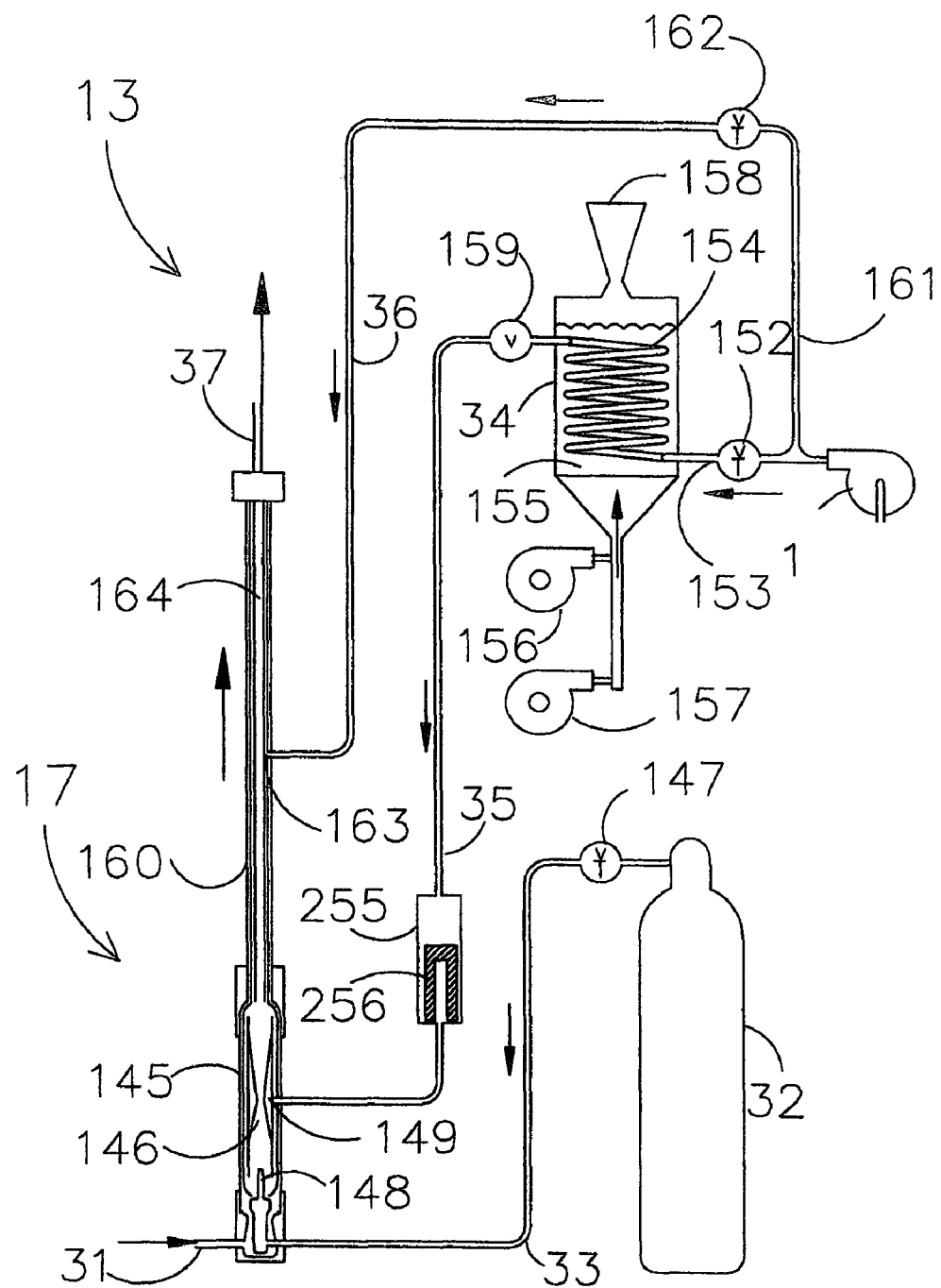
FIG. 4 is a sectional, side elevational view of the supercritical wet oxidation reaction vessel sub-assembly according to the present invention.

As shown in FIGS. 1 and 4, supercritical reaction vessel sub-assembly 13 includes a supercritical wet oxidation reaction vessel 17 and various feed sources. Included among the feed sources is a source of evaporated high pressure oxidizing gas 32 such as oxygen, and a means of delivery, such as tube 33, to the vessel. Other feed sources include a source of high pressure demineralized water, preheated to supercritical conditions in a fluidized bed furnace 34. The preheated demineralized water is conveyed to the reaction vessel via any known means of delivery, such as tube 35. Notably, a portion of the demineralized high pressure water is not preheated and delivered to the reaction vessel via a delivery means such as tube 36. Once the reaction is completed, the products of the process are conveyed to the post treatment cooling and pressure relief sub-assembly 14 via tube 37.

Figure 5:
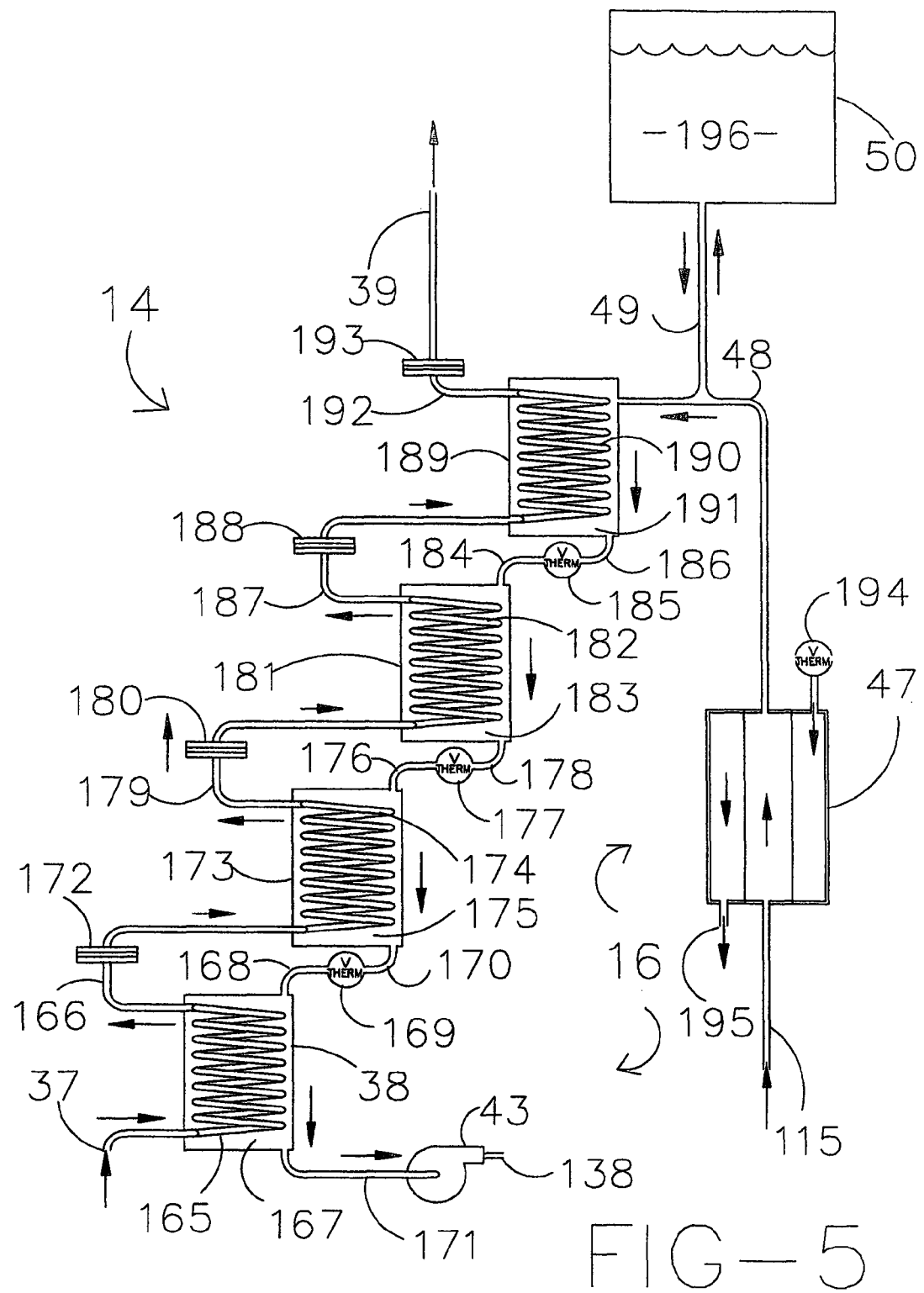
FIG. 5 is a sectional, side elevational view of the post treatment cooling and initial pressure relief sub-assembly according to the present invention.

As shown in FIGS. 1 and 5, cooling within the sub-assembly 14 may be accomplished by conveying the processed product through a cooling fluid bath 38 in FIG. 1. In one embodiment, the cooling fluid used is oil, but other fluids may also be used. There may be any number of cooling baths as it is critical to lower the temperature below the steam flash point of water or whatever the conveying fluid used. Between each cooling bath, an orifice 51 lowers the pressure in the processed fluids flow as will be more fully described in FIG. 5 hereinbelow. After this initial cooling, the processed materials advance to the final pressure relief sub-assembly 15 via tube 39.

Figure 6:
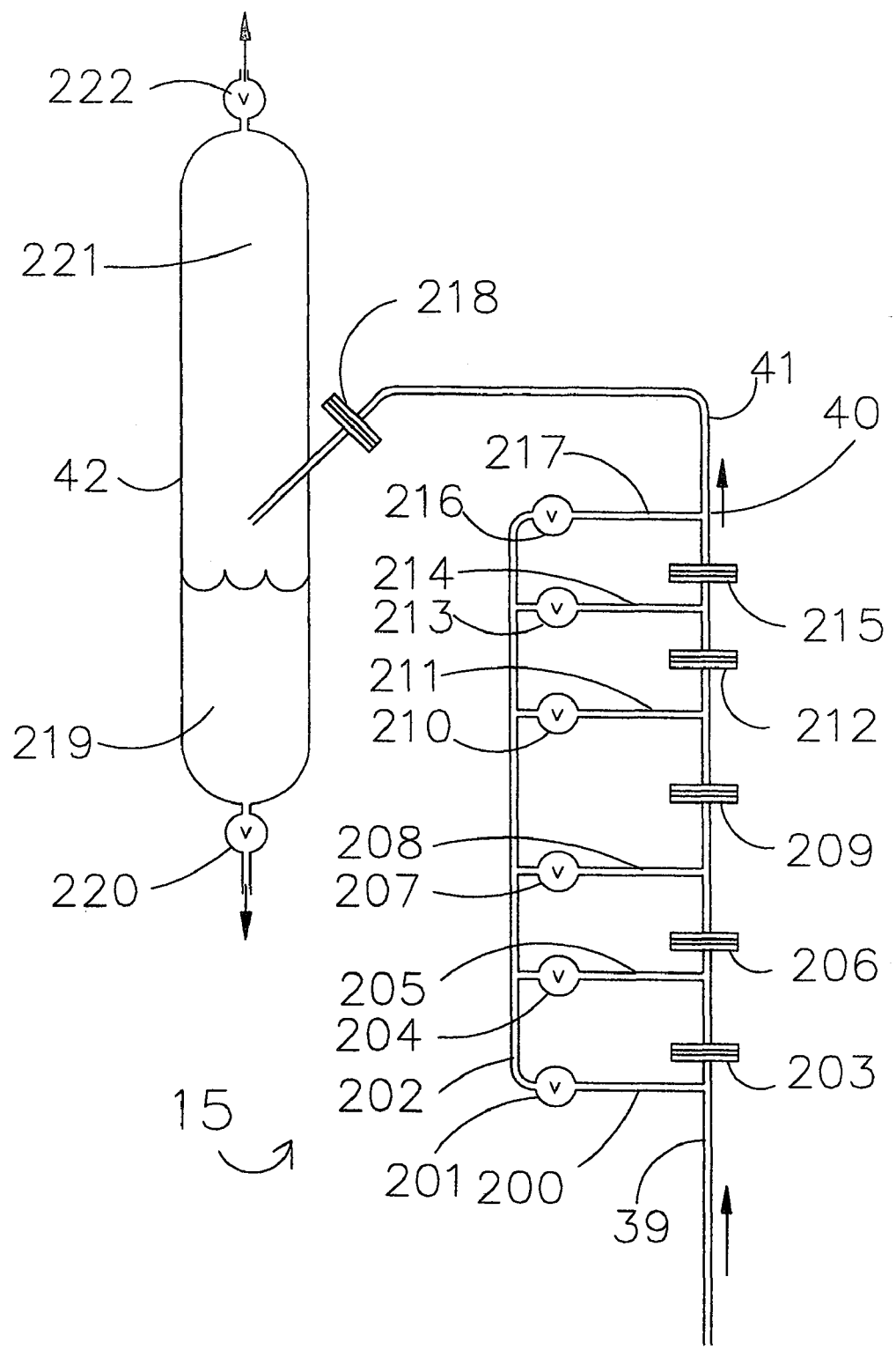
FIG. 6 is a sectional, side elevational view of the final pressure relief sub-assembly according to the present invention.

As shown in FIGS. 1 and 6, most of the pressure on the processed materials still in existence is released by use of a variable battery of fixed orifices with tuning capability as shown at 40 in FIG. 1. After all but about 10 pounds per square inch atmospheric pressure is released, the processed materials advance via tube 41 to a gas separation and final pressure release station 42.

Coincident with the main process stream in FIG. 1, a heat recovery fluid circulation sub-assembly 16 is provided to accomplish the bath heating and cooling and to recover a significant portion of the process thermal requirements. A circulating oil pump 43 extracts hot oil (or other fluid used) from cooling bath 38 and delivers it via thermal control valve 44 to the pre-heat baths 29 where the oil is actually cooled through the pre-heating baths 29 as heat energy is transferred to the materials to be processed. After the oil is cooled by the pre-heat baths 29, it leaves the preheating sub-assembly 12 and is pumped, or otherwise transported, via pump 45 and tube 46 to a temperature trim heat exchanger 47. Any deficiencies or surplus of temperature in this closed loop are accommodated at that point. The cool oil then returns to the post treatment cooling sub-assembly 14 via tube 48. An over pressure expansion or contraction relief for the closed loop oil system is provided for via tubular 49 and surge tank 50.

Turning to FIG. 2, the sub-assembly 11 for pressurizing the materials to be processed is more particularly illustrated. For easy of understanding, the sub-assembly described herein contains two separate modules. The module on the right will be first described, and the module on the left will later be described.

The module on the right best describes the pressurization cycle of the materials charged to the system from tank 20 and cylinder 21. Clean water at ambient temperature in tank 24 is shown as 60. A tube 61 conveys water 60 to pump 26 which raises the pressure in the water 60 by several thousand pounds of pressure. The high pressure clean water 60 is directed to a three way valve 63, and then, to a tube 64, which delivers the high pressure water 60 to cylinder 21 into water space 69. A small portion of the discharge clean water 60 from pump 26 is supplied via a tube 65 to the suction of a slightly over-pressure pump 66, and then, via a tube 67 to a flexible tubing 68 within charging cylinder 21 within the water space 69 to a free head plunger 70. The clean water 60 within flexible tubing 68, being slightly higher in pressure by virtue of pump 66, is further forced into the purging lantern ring labyrinth 71 within free head plunger 70. Free head plunger 70 is described in greater detail in FIG. 7 below, but for understanding of this invention, it will appreciated that the clean water 60 admitted to the water space 69 behind the free head plunger 70 within the charging cylinder 21 forces the free head plunger 70 down within the cylinder 21 and, in turn, the materials to be processed out of the cylinder 21 through tube 72.

It is to be understood that the materials to be processed include oxidizable materials such as those organic materials normally processed via supercritical wet oxidation reactions, as are well known in the art. The preparation process for these materials, which is not shown nor a part of the present invention, includes maceration, blending, equalization and water suspension as will be well known to those skilled in the art. Thus, to begin the processing of these materials, they are placed in suspension in water. Typically, as noted above, from about 1% to about 20% oxidizable materials may be suspended in water. These materials to be processed suspended in water or similar fluid are shown as 74 in tank 20. A tube 75 conveys the fluidized materials to low pressure pump 76, and then, via tube 77 to a normally closed valve 78. When valve 78 is opened, pump 76 operates to transfer the fluidized materials to be processed to the bottom portion of charging cylinder 21. Notably, as the materials enter charging cylinder 21, the pressure overcomes the pressure in water space 69 and the water is pressured back into tank 24. This is known as recharging, and is discussed more particularly below.

Thus, in operation, once the materials to be processed from tank 20 have entered the charging chamber 21, the valve 78 is closed and the flow of clean water 60 from valve 63 is admitted to the space 69 behind a free head plunger 70 within the charging cylinder 21 forcing the fee head plunger down the charging cylinder 21 and forcing the charge of materials in fluid suspension below the free head plunger 70 into tubular 72 when valve 73 is in the normal, or open position. The pressurized material to be processed mixture in 72 then advances through tube 28. The rate of feed of the material to be processed mixture is variable as desired by controlling the speed or output of pump 26. As many feeding modules as desired may operate in sequence or together to assure a smooth and continuous flow of material to be processed through tube 28.

The module of the left works in a like manner, but is shown in a configuration for recharging the pressurization sub-assembly. In tank 25, clean water 80 at ambient temperature is being recharged. The flow within tube 81 is reversed from the normal direction of flow, and water 80 is shown to be flowing into the tank 25. When this happens, tube 82 is not active by the reversal of the three way valve 83. Pump 27 is also deactivated. However, water in tube 84 continues to convey clean water 80 to tube 85 to pump 86 which continues to operate to deliver water 80 to tube 87. Water from pump 86 may add as much as about 20 pounds per square inch to tube 87 and, in turn, to flexible tubing 88 located in water space 89 behind free floating plunger 90 and, in turn, to purging lantern ring labyrinth 91. During recharging, tube 92 is not active and valve 93 is closed.

Materials to be processed are made ready as previously noted above in tank 22 and are shown as 94. The materials to be processed are delivered via tube 95 to low pressure pump 96, and then, via tube 97 to normally closed valve 98 which is opened when pump 96 operates to transfer materials to be processed to charging cylinder 23. Notably, as the materials enter charging cylinder 23, the pressure overcomes the pressure in water space 89 and the water in water space 89 is pressed back into tank 25. The free floating plunger thus slides up the cylinder 23, allowing more material to be processed to enter into the charging cylinder 23. However, due to the pressure in the purging lantern ring labyrinth 91 by virtue of operation of pump 86, the pressure from tubing 88 on the free floating plunger remains sufficient and greater than the pressure from pump 96 to prevent the materials to be processed from entering clean water space 89.

To maintain an open cross section of tube 28, which may be restricted by deposits of certain materials and/or mechanical blockage, a magazine of thermal decomposing pellets may be provided as at 100. These are delivered as required via tube 101 through normally closed valve 102, at the discharge point of pump 103, into tube 104. When the pellet is in place pump 103 is energized, valve 105 is opened, and the pellet advances to and through tubular 28 to the supercritical reaction chamber sub-assembly 13 where it is destroyed, precluding any requirement for retrieval.

Upon entering tube 28, the fluidized materials to be processed travel to the preheating sub-assembly, wherein the materials are subjected to heating in preparation for the supercritical wet oxidation process. The mixture of water and solids in solution and suspension enter, via tube 28, into an upward spiral coil 110 within a heating oil bath 112. The heating oil is temperature controlled by various thermal control valves, such as valve 114, the oil exiting through tube 113. The oil is moved by oil circulating pump 45 and is returned to the closed oil loop system via tube 115. The materials to be processed in water mixture emerges at tube 111, having increased in temperature. The partially preheated fluid is then conveyed to the next preheating stage, namely heating oil bath 116. A more detailed description of a typical heating oil bath is set forth with reference to FIG. 8 hereinbelow.

After the initial preheating of the fluidized materials to be processed through heating oil bath 112, process fluid enters the second preheat oil bath 116 and passes upwardly through a coil 117 to outlet tube 118 through downwardly flowing heating oil 119. Heating oil exits the bath at tube 120, passing through thermal control valve 121 to tube 122 before it enters the first heating oil bath 112. This second stage of preheating further increases the temperature of the process fluid, while cooling the oil.

In like manner, heating oil bath 123 receives the materials to be processed for further preheating via tube 118. The process fluid travels up through coil 124, within downwardly flowing heating oil 126 in heating oil bath 123 and exits that bath via tube 125. The heating oil 126 exits the bath 123 at tube 127 as controlled by thermal valve 128. Valve 128 discharges oil via tube 129 to the lower temperature heating oil bath 116. Likewise, this preheating process continues with heating oil bath 130 receiving the fluid process materials to be preheated via tube 125, the materials passing upwardly within coil 131 through downwardly flowing heating oil 133 and exiting at tube 132, which tube is shown coiled to alleviate expansion stresses. Of course, heating oil 133 exits this bath 130 at tube 134, passing through thermal control valve 135 to tube 136 before it enters the next lower heating oil bath 123. It will be understood that this last bath 130 receives the hottest oil from tube 137, controlled by valve 44, which in turn, received the hot oil from tube 138. This oil, of course, was taken from the cooling oil baths generally indicated as 14 in FIG. 1.

The final stage of preheating is accomplished by immersing the preheated fluidized process material in a coil 139 within a fluidized bed gas fired heater 30. This is necessary as the temperature of the process fluid in the last preheat stage oil bath 130 may not be sufficient at all times to acquire the desired range of temperature and pressure needed for the supercritical wet oxidation reaction. This final stage must be independent from the recycle of heat within the assembly. This is especially true during start-up procedures. The temperature of preheat is determined by the desired final temperature in the supercritical wet oxidation reaction chamber, and the fluidized sand temperature may be as much as 100° F. warmer than the hottest preheat temperature required.

With reference to FIG. 3, the fluidized bed is equipped with an upwardly flowing coil 139, a sand cushion 140, a blower 141 to fluidize the hot sand, and a burner 142 to control the rate of gas firing. A short stack to convey exhaust gasses from the fluidized bed heater is indicated as numeral 143. The finally preheated process materials fluid mixture is then conveyed to the reaction vessel via tube 31.

Turning to FIG. 4, the preheated process fluid mixture is received from tube 31 and conducted into the bottom 145 of the reaction chamber, denoted generally as numeral 17. Within the supercritical reaction chamber 17, the fluid mixtures to be processed are first subjected to a venturi throat 146 to induce mixing with the initial oxygen gas from high pressure gas storage 32 through flow rate control valve 147 to tube 33, and then, to jet 148. As such, the fluid mixtures are recirculated within the upward flowing reaction chamber 146. A more detailed description of the reaction chamber is provided with reference to FIG. 9 hereinbelow.

Uniquely, a fluid film of clean and demineralized supercritical water flows within the reaction chamber. The supercritical water may be produced by any means known in the art, but is produced in one embodiment by a fluidized bed heater 34. To produce the fluid film of clean supercritical water, demineralized water is fed into the heater 34 via a source (not shown) of demineralized water through a tube 150, through a pump 151, through a rate of flow control valve 152, and finally, through a tube 153. The water is provided to the heater 34 under about 4,000 pounds per square inch pressure, as required for the desired supercritical process temperature, and at a flow rate approximately one tenth of that of the input rate of flow of the fluid material to be processed from tube 31. The clean water is heated in an upwardly flowing tubular coil 154 immersed in a fluidized hot sand bed 155. The sand is fluidized by a blower 156 and heated by a natural gas burner 157. An exhaust 158 is provided for the fluidized bed, if natural gas is used as a source of heat. The clean and demineralized water is thus heated to supercritical conditions. The clean water is conveyed to the supercritical reaction vessel via tube 35 and enters the reaction vessel at 149. Notably, the conveyance of the water is further controlled via valve 159. Further details of the internal configuration of this feed to produce a supercritical process fluid envelope is described with reference to FIG. 9 hereinbelow.

It will appreciated that a supercritical wet oxidation reaction occurs within the supercritical wet oxidation reaction vessel 145, wherein the material is oxidized or otherwise processed. As such, the fluid materials typically become even more fluid with precipitants created. The processed fluid materials exit the supercritical wet oxidation reaction vessel 145 by traveling up into to a cooling fluid envelope chamber 160. The purpose of this chamber 160 is to insure the supercritical reaction is terminated and the precipitants created by heating water and the chemical reaction are terminated as well. Notably, the walls of the after cooler chamber 160 also include a fluid film, but these walls are below supercritical temperature conditions to intercept precipitants and to cause precipitation of like materials already in the processed fluid mixture to occur. To provide this fluid film, demineralized water under very high pressure is delivered from a source to pump 151, and from pump 151 to tube 161. The flow of demineralized water then passes through a rate of flow control valve 162 and on through tube 36 to be delivered to the after cooler chamber 160 at 163. The water is delivered at 163 through a porous ceramic lining tubular 164. The ceramic lining 164 and the like lining in the reaction vessel proper are typical of the industry with 60 micron passages. Additional details of one embodiment of a desired configuration are given hereinbelow with reference to FIG. 9.

As described more particularly with respect to FIG. 5, the processed material, after initial cooling in the after cooling chamber 160, passes out of the supercritical reaction vessel sub-assembly 13 through tube 37 and into post treatment cooling and initial pressure dropping sub-assembly 14. The post treatment and heat recovery stage of the process begins with the treated mixture of water and solids in solution and suspension entering, via tube 37, an upwardly spiraling coil 165 within a cooling oil bath 38 and emerging at a lower temperature from the bath 167 through tube 166. Much like the preheating process described previously, cooling oil 167 enters bath 38 via tube 168, from temperature control valve 169 and from tube 170. The heated oil 167 leaves the cooling bath 38 via tube 171 and travels to the suction side of pump 43, where the oil is then conveyed through tube 138 to the oil loop thermal control valve 44 as shown in FIGS. 1 and 3.

The partially cooled process fluid exits this first cooling bath 38 at tube 166 and is conveyed to a pressure reducing orifice 172 and, then, to the second stage heat recovery cooling oil bath 173. In the second stage cooling bath 173, the process fluid enters the bath 173, passes upwardly in a coil 174 located in downwardly flowing cooling oil 175, and emerges from the bath via outlet tube 179. The cooling oil 175 enters the bath 173 at tube 176 from bath control valve 177 and from tube 178. The processed mixture leaves cooling oil bath 173 via tube 179, through pressure reducing orifice 180.

It should be noted the coil 174 does not have to be spiraled, but is so configured to conserve vertical height in the upward flowing assembly. The upward flow configuration is required to allow the system to bleed gasses and steam upwardly and allowing these non-condensing gasses to escape the assembly without being trapped.

In a like manner, the third cooling oil bath 181 receives the processed materials to be cooled from orifice 180, and passes the materials up through coil 182. At the same time, cooling oil 183 flows downwardly and leaves the bath 181 though tube 178. Cooling oil 183 is delivered to bath 181 via tube 184 from thermal control valve 185 and from tube 186. The materials in coil 182 leave the cooling bath 181 via tube 187 and continue to pressure reducing orifice 188. In the embodiment shown, the processed mixture then enters a final cooling bath 189 and travels through coil 190 located in oil bath 191. The processed mixture exits through tube 192 to pressure reducing orifice 193, and leaves the sub-assembly 14 via tube 39.

The temperature of the cooling oil 191 in the cooling oil bath 189 is controlled via the thermal adjustment of the heat recovery circulating oil loop heat exchanger 47 via thermal control valve 194. A temperature control secondary loop may exit heat exchanger 47 at tube 195 and is normally of a cooling trim nature. Oil from the oil circulating loop from the preheating sub-assembly 12 shown in FIG. 3, enters heat exchanger 47 via tube 115, and then, upon passing through it, proceeds through tube 48 and into cooling oil bath 191. An expansion provision requirement is met via tube 49 which services storage tank 50 with the reservoir for oil shown as 196. The heat recovery fluid circulation loop sub-assembly 16 to recover process heat operates at a low pressure in the range of from about ten to about twenty pounds per square inch range.

Final pressure is released in the final pressure relief sub-assembly 15 as more particularly shown in FIG. 6. The now-cooled processed mixture enters this sub-assembly at tube 39. Processed mixtures can then either pass through tube 200 and through normally closed valve 201, to by-pass tubular 202, if the valve 201 is opened, or can be directed to orifice station 203. If the operator does not desire a pressure drop as would be associated with directing the processed stream to orifice station 203, then valve 201 should be opened. The operator may also open or close valve 204 as desired to admit the stream through tube 205 directly to orifice station 206, thereby preventing all of the processed stream from being forced through orifice station 203. In a like manner, the complete pressure drop of station 206 can be avoided by opening normally closed valve 207 and allowing the stream to pass through tube 208, so as to direct the flow of the processed stream to orifice station 209. Again, if desired, orifice station pressure reduction can be by-passed using valve 210 and tube 211, whereby the flow may be directed through orifice station 212. And, yet again, in similar fashion, by using by-pass valve 213 and tube 214, the stream can be directed to orifice station 215, which in turn can be by-passed by opening valve 216 and using tube 217. Thus, the orifice stations may be used in series or in parallel.

In this manner, any pressure drop can be managed in steps without the use of throttling valves. Each of the valves in this sub-assembly are either fully open or fully closed. The pressure developed by the clean water pumps 26 or 27 of FIG. 1 are determined by the resistance to flow established by all the orifices of sub-assembly 14 and 15 of FIG. 5 and FIG. 6. If more or less pressure is desired than is possible using the fixed orifice stations the expendable orifice stations can be changed. The use of a plurality of orifice stations is believe desirable over conventional throttling valves because the mixtures emerging from supercritical wet oxidation are notorious for their abrasive and erosive nature, due in large part to the suspended solids and cavitating gasses that destroy non-resistive materials. Orifices may be made from expendable, but erosive resistance, materials, and are a simple solution to the problem of controlling the severe pressure drop from supercritical pressures. It should be noted in passing if the energy content of the process stream is adequate the pressure and temperature reductions of sub-assembly 14 and sub-assembly 15 can be replaced with a power recovery device as described in U.S. Pat. No. 5,147,564.

Once the majority of the pressure has been reduced using the battery of orifice stations 203, 206, 209, 212, and 215, the process fluid may then be transported from junction 40, through tube 41, to the final orifice station 218. The discharge of this orifice is tangentially directed downward onto the water 219 in gas separation vessel 42. The water surface absorbs the impact of the abrasive gas/solids/water mixture from orifice 218. The water and solids mixture may be extracted from vessel 42 by opening valve 220, which responds to, and maintains the level of the water 219 in vessel 42. The gas may be extracted, at a few pounds per square inch pressure within the vessel 42, as at 221, by opening the backpressure control valve 222 for further processing or recovery.

One embodiment of a free head plunger, as described in FIG. 2 as 70 or 90, is illustrated and more particularly shown in FIG. 7. For purposes of the description and clarity for FIG. 7, some numbers have been used from FIG. 2 which refer to the module on the right in FIG. 2. It is to be understood that the free head plunger shown in FIG. 7 can be used in either module, regardless of numbering.

The purpose of the free head plunger is to deliver pressure to the material to be processed 74 within the charging cylinder 21, based upon the water pressure in water space 69 forcing the plunger downward. The plunger 70 is not connected to any armature or rod to deliver the pushing force, it being understood that flexible tubing 68 is not such an armature or rod, and is basically coiled within the cylinder 21. The plunger is completely free to move in response to the pressure on either side of it. Flexible tubing 68 delivers water pressure to free head plunger 70 and then to the plunger lantern ring labyrinth 71. This internal pressure is always greater than the pressure on either side of the free head plunger 70 without regard to which direction the free head plunger 70 is moving within cylinder 21, and is, therefore, essentially fluidly sealable. By fluidly sealable, it is meant that the greater internal pressure within the plunger 70 prevents both the clean water from entering into the materials to be processed space within cylinder 21 and, vice verse, prevents the materials to be processed from entering into the clean water space 69 within cylinder 21.

To seal the water pressure within the lantern ring labyrinth 71 a rubber ring seal 225, held in place by a metal retaining ring 226, receives water pressure via passages 227 which communicate with water pressure within flexible tubing 68. A similar flexible seal 228 is restrained by metal ring 229 on the clean water side of the free head plunger 70. The seal rings 225 and 228 bear against the inner wall 230 of cylinder 21 in a manner as to provide stability for the free head plunger 70 and to wipe the sides of the surface 230 by the flushing action of water pressure within the labyrinth 227. The water pressure in the labyrinth 227 also provides lubricating action to the flexible seals 225 and 228. Thus, it will be appreciated that inner wall surface 230 of the cylinder 21 is continuously cleaned by the pressurized water within the labyrinth 227.

One embodiment of a heating or cooling oil bath used for heating the fluid suspension of the material to be processed and/or cooling the processed material is shown more particularly in FIG. 8. Again, like above, the description of the typical oil bath is described using many of the numbers associated with the first stage heating oil bath shown in FIG. 3. However, it will be appreciated that this oil bath is substantially the same for all of the heating oil baths as well as for essentially all of the cooling oil baths shown in FIG. 5.

In the illustrated embodiment, the mixture enters the bath through tube 28 and flows upwardly through tubular coil 110, exiting the bath at tube 111. The oil 112 enters the oil bath through tube 122 and flows downwardly in counter-flow heat exchange fashion to oil bath exit tube 113. The entrance tube 122 for the oil bath should be positioned to allow for the bleeding of gasses in the oil prior to induced flow. The bath may be equipped with an access port flange device 232. When opened, the coil tubular 110 may be removed for service or replacement via attachment 233 when cap 234 is removed. Within the bath is a baffle 235 to control bath short circuiting. The entire bath may be encased in an insulation 236.

One embodiment of a supercritical reaction vessel according to the concepts of the present invention is detailed in FIG. 9 and generally indicated as numeral 17. The fluid envelop to enclosed the supercritical reaction in the vessel itself is shown as 237 and 238 and in the reaction after cooler chamber as 239 on the reaction wetted surfaces. In this embodiment, the materials to be processed suspended in water enter the reaction vessel at tube 31 and pass into a feed passage 240. Simultaneously, oxygen enters the vessel via tube 33 and passes into its feed passage 241, and, in turn, into an injection tubular 242. These two reactants, namely the fluid mixture to be processed and oxygen, commingle in the venturi throat 146 of the vessel and undergo intense mixing in venturi 243. The velocity in the venturi throat is as high as practical to avoid erosion of the venturi walls. The fluid envelop can be made richer at this location due to the reduced pressure of the process flow stream within the venture 243. Some of the reacted mixture may exit the initial supercritical reaction zone at 244, and the remainder may be caused to re-circulate through passage 245. The primary reaction vessel chamber is defined by a porous ceramic wall 246 that allows supercritical but de-mineralized water of like thermal characteristics into the supercritical chamber. The de-mineralized water is supplied from the feed tube 35 to an annulus 247 defined between the structural metal reaction vessel wall 145 and the porous ceramic wall 246. The fluid envelop 237 is formed in the inner surface of the ceramic wall 246 by the de-mineralized water seeping through the pores of the ceramic wall 246. The pressure drop across porous wall 246 is small, e.g., less than about 10 pounds per square inch, and is designed to allow only sufficient passage of water to sustain the fluid envelop 237. In similar fashion, tube 35 also supplies de-mineralized water to a feed ceramic tube 248 through a passage 249 that communicates with annulus 247. The enclosure for supercritical de-mineralized water feed tube 248 is enclosed within and defined by porous ceramic walls 250, which, in turn, also defines the venturi passage 243 and recirculation passages 245. The feed tube 248 is one of a plurality of similar tubes that convey demineralized supercritical water as well as providing support the interior porous ceramic walls 250. In one embodiment, there are four such feed tubes 248. In another embodiment, there are more than four such feed tubes 248. And in another embodiment, there are less than four such feed tubes 248. It will be further appreciated that supercritical, demineralized water from passage 249 and feed tubes 248 can be transported to annulus 251 defined by the reaction chamber's porous ceramic walls 250. Thus, the water can be forced through walls 250 to sustain the interior supercritical reaction inner chamber fluid envelop 238.

Before the reaction products can leave the reaction vessel sub-assembly 17, it must first be processed to terminate all forms of precipitation from the reaction including minerals and salts coming out of solution. To accomplish this, the reaction products leave the primary reaction chamber at 244 and are introduced to a secondary chamber 164 defined by porous ceramic wall 252. Wall 252, within the secondary structural metal wall 160 defines an annulus 253 that receives de-mineralized water at supercritical pressures slightly higher than chamber 164 but at ambient temperatures via tube 36. The slightly higher pressure causes the ambient temperature de-mineralized water to pass through wall 252 to sustain the fluid envelop 239 encasing the interior surface of the wall 252. Flow velocities within chamber 164 are recommended to be laminar in nature, and the amount of flow through wall 252, by engineering or operation, is intended to be such as to cause the water suspension in chamber 164 to be lowered to thermal conditions less than those defined as supercritical, usually considered to be about 3,206.2 pounds per square inch pressure and 705.4° F. The treated materials are then caused to exit the reaction secondary chamber 164 at tube 37. The reaction vessel may be enclosed within a heat conserving insulation blanket 254.

Finally, it is noted that, because de-mineralized water has a certain leaching capability, the flow line 35 (as shown in FIG. 4) may include an introducing chamber 255 which houses a sacrificial barrier 256 made of the same porous ceramic material as wall 252 of FIG. 9. The sacrificial barrier is believed to buffer the erosive effects of the de-mineralized water feed and enhance the useful life of porous ceramic wall 252.

The above embodiment of a reaction vessel with fluid envelop, which may employ a flow rate of between less than one gallon per minute and fifty or more gallons per minute, and include oxidizable wastes concentrations between fractional concentrations and 20% or more concentration, within practical and economic limitations, is exemplary only and is not a limitation of the present invention.

It should thus be evident that the method and apparatus disclosed herein is capable of sustaining supercritical wet oxidation reactions within a sustained fluid envelop with all the advantages thereto. One skilled in the art will appreciate that the method and apparatus exemplified herein may be varied without departing from the scope of the invention. Moreover, the invention includes all such modifications and variations that fall within the scope of the attached claims.

What is claimed is:

1. A method for conducting a supercritical wet oxidation reaction between at least two reactants within a supercritical reaction vessel having at least one vessel wall for physically containing the reaction, the method comprising:
    introducing a continuous flow of de-mineralized, supercritical fluid into a primary chamber comprising the at least one vessel wall of the supercritical reaction vessel to form a film-like, clean fluid surface between the reactants and the at least one vessel wall; and
    commingling the reactants in the primary chamber to form a reaction product
    wherein the supercritical reaction vessel further comprises a secondary chamber for terminating any forms of precipitation from the reaction product, the secondary chamber defined by at least one vessel wall, and wherein the method further comprises
    removing the reaction product from the primary chamber to the secondary chamber: and
    introducing a continuous flow of de-mineralized, supercritical pressurized fluid at atmospheric temperature into the secondary chamber of the supercritical reaction vessel to form a film-like, clean fluid surface between the reactant product and the at least one vessel wall defining the secondary chamber.

2. The method of claim 1, further comprising controlling a the flow rate of demineralized, supercritical fluid being introduced into the supercritical reaction vessel.

3. The method of claim 1, wherein the step of introducing a continuous flow of clean supercritical fluid includes preventing any reactants or precipitated solids from contacting the at least one vessel wall of the primary chamber, thereby preventing the reactants or solids from adhering to or corroding the at least one vessel wall of the primary chamber.

4. The method of claim 2, wherein the at least on vessel wall of the primary chamber is a wall made of porous materials and wherein the step of controlling the flow rate includes controlling the rate of passage of the de-mineralized supercritical fluid through the wall.

5. The method of claim 4, wherein the step of controlling the rate of passage includes passing the de-mineralized supercritical fluid through the porous wall in an amount and at a pressure and velocity sufficient to provide a fluid surface to the porous wall.

6. The method of claim 4, wherein the porous wall is for physically containing the reaction and is made of ceramic and wherein an outer non-porous wall exists for structural support, and wherein the method further includes supplying de-mineralized supercritical fluid between the porous ceramic wall and non-porous wall.

7. The method of claim 6, wherein the rate of passage of the de-mineralized, supercritical fluid through the ceramic wall is controlled by maintaining the supercritical pressure of the de-mineralized, supercritical fluid at a higher supercritical pressure than the pressure applied to the reactants during commingling of the reactants within the supercritical reaction vessel.

8. The method of claim 1, wherein the at least one vessel wall of the primary chamber of the supercritical reaction vessel comprises by a ceramic wall and includes at least another ceramic wall defining passages within the primary chamber, and wherein the step of introducing a continuous flow of demineralized, supercritical fluid includes introducing the continuous flow of de-mineralized, supercritical fluid through the ceramic walls to form a film-like, clean fluid surface between the reactants and the ceramic walls.

* * * * *